United States Patent
Chang (10) Patent No.: US 10,224,825 B2
(45) Date of Patent: Mar. 5, 2019

(54) PRIMARY SIDE FEEDBACK CONTROL FOR A RESONANT CONVERTER WITH A TRANSFORMER MODEL

(71) Applicant: DELTA ELECTRONICS, INC., Taoyuan (TW)

(72) Inventor: Yu-Ming Chang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/800,066

(22) Filed: Nov. 1, 2017

(65) Prior Publication Data

US 2018/0309373 A1    Oct. 25, 2018

(30) Foreign Application Priority Data

Apr. 20, 2017    (CN) .......................... 2017 1 0260592

(51) Int. Cl.
  *H02M 3/335*    (2006.01)
  *H02M 3/337*    (2006.01)
  *H02M 1/00*    (2006.01)

(52) U.S. Cl.
  CPC ..... *H02M 3/33569* (2013.01); *H02M 3/3376* (2013.01); *H02M 3/33523* (2013.01); *H02M 2001/0009* (2013.01); *H02M 2001/0058* (2013.01)

(58) Field of Classification Search
  CPC ............................................ H02M 3/335–3/42
  See application file for complete search history.

(56) References Cited

U.S. PATENT DOCUMENTS

| 8,842,449 B1 | 9/2014 | Tong |
| 2008/0082096 A1* | 4/2008 | Shores ............... A61B 18/1206 606/34 |
| 2009/0059622 A1 | 3/2009 | Shimada et al. |

(Continued)

FOREIGN PATENT DOCUMENTS

CN    101795076 A    8/2010

OTHER PUBLICATIONS

The pertinent parts of CN101795076A.
The pertinent parts of US20090059622A1.

*Primary Examiner* — Gary L Laxton
*Assistant Examiner* — Peter Novak
(74) *Attorney, Agent, or Firm* — CKC & Partners Co., LLC (57) ABSTRACT

A power converter includes a primary-side switching circuit, a resonant circuit, a transformer including primary and secondary windings, a secondary-side rectifying circuit, voltage and current sensing circuits, and a processing circuit. The primary-side switching circuit controls switches to be on or off based on a pulse signal to convert an input voltage to a square wave signal. The resonant circuit is coupled to the primary-side switching circuit and receives the square wave signal to provide a primary-side current. The primary winding is coupled to the resonant circuit. The secondary-side rectifying circuit is coupled to the secondary winding and rectifies the secondary ac signal output by the secondary winding and outputs an output voltage. The voltage and current sensing circuits detect the voltage and current of the primary winding and output voltage and current sensing signals. The processing circuit outputs the pulse signal according to the voltage and current sensing signals.

16 Claims, 6 Drawing Sheets

(56) References Cited

U.S. PATENT DOCUMENTS

| | | | |
|---|---|---|---|
| 2010/0220500 A1 | 9/2010 | Mino et al. | |
| 2011/0249473 A1* | 10/2011 | Li | H02M 3/33515 363/21.02 |
| 2015/0049520 A1* | 2/2015 | Xu | H02M 1/32 363/21.02 |
| 2015/0180345 A1* | 6/2015 | Frost | H02M 3/3376 363/17 |

* cited by examiner

PRIMARY SIDE FEEDBACK CONTROL FOR A RESONANT CONVERTER WITH A TRANSFORMER MODEL

RELATED APPLICATIONS

This application claims priority to China Application Serial Number 201710260592.4, filed Apr. 20, 2017, which is herein incorporated by reference.

BACKGROUND

Technical Field

The present disclosure relates to a power converter, and in particular, to a resonant power converter.

Description of Related Art

A LLC resonant converter may provide a stable output voltage by frequency modulation. Recently, because being suitable for wide-range input voltage and large power output, the LLC resonant converter is widely applied in renewable energy power supply systems such as a solar PV (photovoltaic) system.

However, the secondary side output voltage must be sampled and feedback to the primary side for the control in the existing converter control strategy, and thus isolation elements with a high voltage withstand ability are required and arranged for signal transmission, which causes the cost of the circuit increases. Therefore, an important area of research in the field involves ways in which to improve the existing control method of the power converter.

SUMMARY

One aspect of the present disclosure is a power converter. The power converter includes a primary-side switching circuit, a resonant circuit, a transformer, a secondary-side rectifying circuit, a voltage sensing circuit, a current sensing circuit and a processing circuit. The primary-side switching circuit includes a plurality of switches. The primary-side switching circuit is configured to switch the switches to be on or off based on a pulse signal to convert a dc input voltage to a square wave signal. The resonant circuit is electrically coupled to the primary-side switching circuit and configured to receive the square wave signal to provide a primary-side current. A primary winding of the transformer is electrically coupled to the resonant circuit. The secondary-side rectifying circuit is electrically coupled to a secondary winding of the transformer and configured to rectify a secondary ac signal outputted by the secondary winding and to output an output voltage. The voltage sensing circuit is configured to detect voltage across the primary winding and output a voltage sensing signal accordingly. The current sensing circuit is configured to detect the primary-side current and output a current sensing signal accordingly. The processing circuit is configured to output the pulse signal according to the voltage sensing signal and the current sensing signal.

Another aspect of the present disclosure is a power converter. The power converter includes a primary-side circuit, a transformer, a voltage sensing circuit, a current sensing circuit, a secondary-side rectifying circuit, and a processing circuit. The primary-side circuit includes a plurality of switches, and the switches are configured to be on or off according to a plurality of driving signals. The transformer includes a primary winding electrically coupled to the primary-side circuit and configured to receive a primary-side square wave signal, and a secondary winding configured to output a secondary ac signal in response to the primary-side square wave signal. The voltage sensing circuit is configured to detect voltage across the primary winding and output a voltage sensing signal accordingly. The current sensing circuit is configured to detect a primary-side current of the primary winding and output a current sensing signal according to the primary-side current. The secondary-side rectifying circuit is electrically coupled to the secondary winding and configured to rectify the secondary ac signal and output an output voltage. The processing circuit is configured to adjust a switching frequency of the plurality of driving signals according to the voltage sensing signal and the current sensing signal.

Yet another aspect of the present disclosure is a control method of a power converter. The control method of the power converter includes detecting, by a current sensing circuit in the power converter, a primary-side current flowing through a primary-side circuit in the power converter to obtain a current sensing signal; detecting, by a voltage sensing circuit in the power converter, a voltage across a primary winding of a transformer in the power converter to obtain a voltage sensing signal, wherein the primary winding is electrically coupled to the primary-side circuit; obtaining a relationship equation between the voltage across the primary winding and an output voltage of the power converter based on a transformer model corresponding to the transformer; and controlling, based on the relationship equation between the voltage across the primary winding and the output voltage, a switching frequency of a plurality of switches in the primary-side circuit according to the voltage sensing signal and the current sensing signal to adjust the output voltage.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
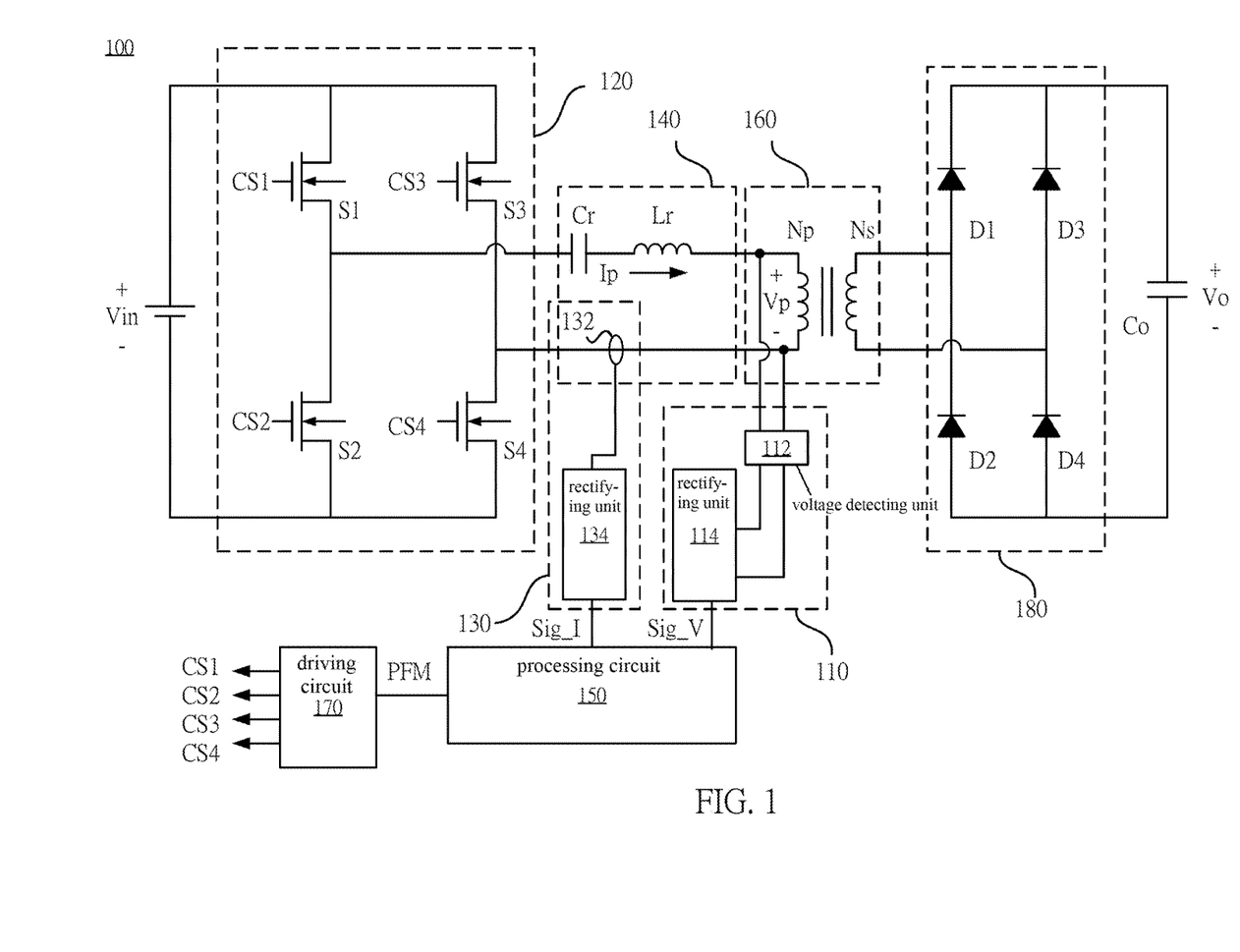
FIG. 1 is a schematic diagram illustrating a power converter according to some embodiments of the present disclosure.

Reference is made to FIG. 1. FIG. 1 is a schematic diagram illustrating a power converter 100 according to some embodiments of the present disclosure. As shown in FIG. 1, in some embodiments, the power converter 100 includes a primary-side switching circuit 120, a resonant circuit 140, a transformer 160, a secondary-side rectifying circuit 180, a voltage sensing circuit 110, a current sensing circuit 130, a processing circuit 150, and a driving circuit 170. In some embodiments, the power converter 100 may be applied to a DC-DC converter device in a solar PV system, so as to convert the DC voltage outputted by solar panels to a proper voltage level. Thus, an inverter at post stage may convert the DC power to an AC power which is in-phase with a power grid so as to connect renewable energy to the power grid.

The primary-side switching circuit 120 and the resonant circuit 140 form a primary-side circuit of the power converter 100, in which the primary-side circuit is electrically coupled to the primary winding Np of the transformer 160. Specifically, an input side of the primary-side switching circuit 120 is electrically coupled to an input voltage source, and configured to receive a DC input voltage Vin. An output side of the primary-side switching circuit 120 is electrically coupled to an input side of the resonant circuit 140, and configured to output an square wave signal to the resonant circuit 140. An output side of the resonant circuit 140 is electrically coupled to the primary winding Np of the transformer 160. A secondary winding Ns of the transformer 160 is electrically coupled to an input side of the secondary-side rectifying circuit 180. An output side of the secondary-side rectifying circuit 180 is electrically coupled to an output capacitor Co, in order to provide a DC output voltage Vo to a post-stage circuit. Therefore, the primary-side switching circuit 120, the resonant circuit 140, the transformer 160, and the secondary-side rectifying circuit 180 may form a circuit structure of a LLC resonant converter.

In addition, as depicted in FIG. 1, the voltage sensing circuit 110 is electrically coupled to two terminals of the primary winding Np, and configured to detect the voltage across the primary winding Np, and output a voltage sensing signal Sig_V accordingly. The current sensing circuit 130 is arranged on the circuit of the resonant circuit 140 to detect the primary-side current Ip flowing through the resonant circuit 140. For example, the voltage sensing circuit 110 may include a voltage detecting unit 112 and a rectifying unit 114. and the current sensing circuit 130 may include a current detecting unit 132 and a rectifying unit 134. In some embodiments, the voltage detecting unit 112 and the current detecting unit 132 may be implemented by induction coils, but the present disclosure is not limited thereto. The rectifying unit 114 is electrically coupled to the voltage detecting unit 112 and configured to rectify the detecting signal obtained by the voltage detecting unit 112, in order to output a voltage sensing signal Sig_V to indicate the voltage Vp across two terminals of the primary winding Np. The rectifying unit 134 is electrically coupled to the current detecting unit 132 and configured to rectify the detecting signal obtained by the current detecting unit 132, in order to output a current sensing signal Sig_I to indicate the primary-side current Ip.

The processing circuit 150 is electrically coupled to the voltage sensing circuit 110 and the current sensing circuit 130. The driving circuit 170 is electrically coupled between the processing circuit 150 and the primary-side switching circuit 120. In some embodiments, the processing circuit 150 may include a voltage-to-frequency converter configured to output a pulse frequency modulation (PFM) signal PFM to the driving circuit 170 according to the voltage sensing signal Sig_V and the current sensing signal Sig_I. After receiving the pulse frequency modulation signal PFM from the processing circuit 150, the driving circuit 170 may output driving signals CS1-CS4 respectively to the switches S1-S4 in the primary-side switching circuit 120 according to the pulse frequency modulation signal PFM, so as to switch the switches S1-S4 to be on or off based on a switching frequency of the driving signals CS1-CS4. Thus, the processing circuit 150 may change the switching frequency of the square wave signal that is outputted by the primary-side switching circuit 120 by using the pulse frequency modulation signal PFM. In some embodiments, the voltage-to-frequency converter in the processing circuit 150 may be implemented by cooperation of various circuits such as an integrator and a comparator, and further detailed explanation is not described again herein for the sake of brevity.

Accordingly, as the switching frequency of the wave square signal outputted by the primary-side switching circuit 120 is changed, the impedance of the resonant circuit 140 is changed in response to the switching frequency. Therefore, the induced voltage in the primary winding Np of the transformer 160 varies as the switching frequency varies, and the corresponding DC output voltage Vo is outputted via the secondary winding Ns and the secondary-side rectifying circuit 180 at the secondary side. Alternatively stated, the DC output voltage Vo may be controlled by the switching frequency of the driving signals CS1-CS4.

Specifically, in various embodiments, the primary-side switching circuit 120 may be implemented by a half-bridge, a full bridge, or various types of switching circuits. For example, in the embodiment shown in FIG. 1, the primary-side switching circuit 120 may be implemented by a full bridge circuit. The primary-side switching circuit 120 includes switches S1, S2, S3, and S4. As depicted in the drawing, a first terminal of the switch S1 is electrically coupled to a positive terminal of the input voltage source. A second terminal of the switch S1 is electrically coupled to the first terminal of the resonant circuit 140. A first terminal of the switch S2 is electrically coupled to the first terminal of the resonant circuit 140. A second terminal of the switch S2 is electrically coupled to a negative terminal of the input voltage source. A first terminal of the switch S3 is electrically coupled to the positive terminal of the input voltage source. A second terminal of the switch S3 is electrically coupled to the second terminal of the resonant circuit 140. A first terminal of the switch S4 is electrically coupled to the second terminal of the resonant circuit 140. A second terminal of the switch S4 is electrically coupled to the negative terminal of the input voltage source.

Thus, on the condition that the switches S1, S4 are turned on according to the corresponding driving signals CS1, CS4, and the switches S2, S3 are turned off according to the corresponding driving signals CS2, CS3, the first terminal of the resonant circuit 140 is electrically coupled to the positive terminal of the input voltage source, and the second terminal of the resonant circuit 140 is electrically coupled to the negative terminal of the input voltage source. On the other hand, on the condition that the switches S1, S4 are turned off according to the corresponding driving signals CS1, CS4, and the switches S2, S3 are turned on according to the corresponding driving signals CS2, CS3, the first terminal of the resonant circuit 140 is electrically coupled to the negative terminal of the input voltage source, and the second terminal of the resonant circuit 140 is electrically coupled to the positive terminal of the input voltage source. Therefore, the primary-side switching circuit 120 may switch the switches S1-S4 to be on or off based on the switching frequency so as to convert the DC input voltage Vin to the square wave signal with 50% duty cycle that is transmitted to the resonant circuit 140.

In some embodiments, the resonant circuit 140 includes a resonant capacitance unit Cr, and a resonant inductance unit Lr. The resonant capacitance unit Cr and the resonant inductance unit Lr are electrically coupled in series. For example, as depicted in FIG. 1, a first terminal of the resonant capacitance unit Cr is electrically coupled to the first terminal of the resonant circuit 140, so as to be electrically coupled to the switches S1, S2. A second terminal of the resonant capacitance unit Cr is electrically coupled to a first terminal of the resonant inductance unit Lr. A second terminal of the resonant inductance unit Lr is electrically coupled to a first terminal of the primary winding Np. A second terminal of the primary winding Np is electrically coupled to the second terminal of the resonant circuit 140, so as to be electrically coupled to the switches S3, S4, but the present disclosure is not limited thereto. In some embodiments, the resonant inductance unit Lr may be formed by the leakage inductance of the transformer 160. In some other embodiments, the resonant capacitance unit Cr and the resonant inductance unit Lr may also be electrically coupled in various ways, so as to construct the LLC resonant circuit.

Therefore, the primary winding Np may be configured to receive the primary square wave signal from the resonant circuit 140. The secondary winding Ns may output a secondary ac signal to the secondary-side rectifying circuit 180 in response to the primary square wave signal, such that the transformer 160 establishes the power transmission between the primary side and the secondary side.

In various embodiments, the secondary-side rectifying circuit 180 may be implemented by a half bridge, a full bridge, or various types of rectifying circuits. For example, in the embodiment shown in FIG. 1, the secondary-side rectifying circuit 180 may be implemented by a full bridge rectifying circuit. The secondary-side rectifying circuit 180 includes diodes D1, D2, D3, and D4. As depicted in the drawing, an anode of the diode D1 is electrically coupled to the first terminal of the secondary winding Ns, and a cathode of the diode D1 is electrically coupled to the first terminal of the output capacitor Co. An anode of the diode D2 is electrically coupled to the second terminal of the output capacitor Co, and a cathode of the diode D2 is electrically coupled to the anode of the diode D1. An anode of the diode D3 is electrically coupled to the second terminal of the secondary winding Ns, and a cathode of the diode D3 is electrically coupled to the first terminal of the output capacitor Co. An anode of the diode D4 is electrically coupled to the second terminal of the output capacitor Co, and a cathode of the diode D4 is electrically coupled to the anode of the diode D3.

Thus, the secondary-side ac signal induced and outputted by the secondary winding Ns is rectified and filtered by the secondary-side rectifying circuit 180 and the output capacitor Co, and the DC output voltage Vo may be outputted.

Therefore, by using the operations of the aforementioned circuits, the power converter 100 may convert the DC input voltage Vin to the DC output voltage Vo with a proper voltage level that is provided to a post-stage circuit.

It is noted that, in some embodiments, the DC output voltage Vo is within a medium voltage (MV) range. On the condition that the power converter 100 detects the secondary DC output voltage Vo directly and feedbacks the signal to the primary-side, an isolation elements having high voltage and current withstand capability is required to feedback the secondary-side feedback voltage to the primary-side, which causes the increase of the costs. In some embodiments of the present disclosure, the voltage sensing circuit 110 may be configured to directly detect the voltage Vp across the primary winding Np at the primary side of the power converter 100, and the processing circuit 150 may be configured to obtain a relationship equation between the voltage Vp across the primary winding Np and the output voltage Vo based on a transformer model corresponding to the transformer 160, in order to adjust the pulse signal accordingly, such that the primary-side switching circuit 120 is configured to switch the switches S1-S4 to be on or off according to the pulse signal to convert the DC input voltage Vin to the square wave signal. Therefore, the processing circuit 150 may adjust the switching frequency of the switches S1-S4 by the pulse signal to control the output voltage Vo. In the following paragraphs, the relationship equation between the voltage Vp across the primary winding Np and the output voltage Vo and the specific operation of adjusting the switching frequency of the switches S1-S4 by the processing circuit 150 will be discussed in detail in accompanying with related drawings.

Figure 2:
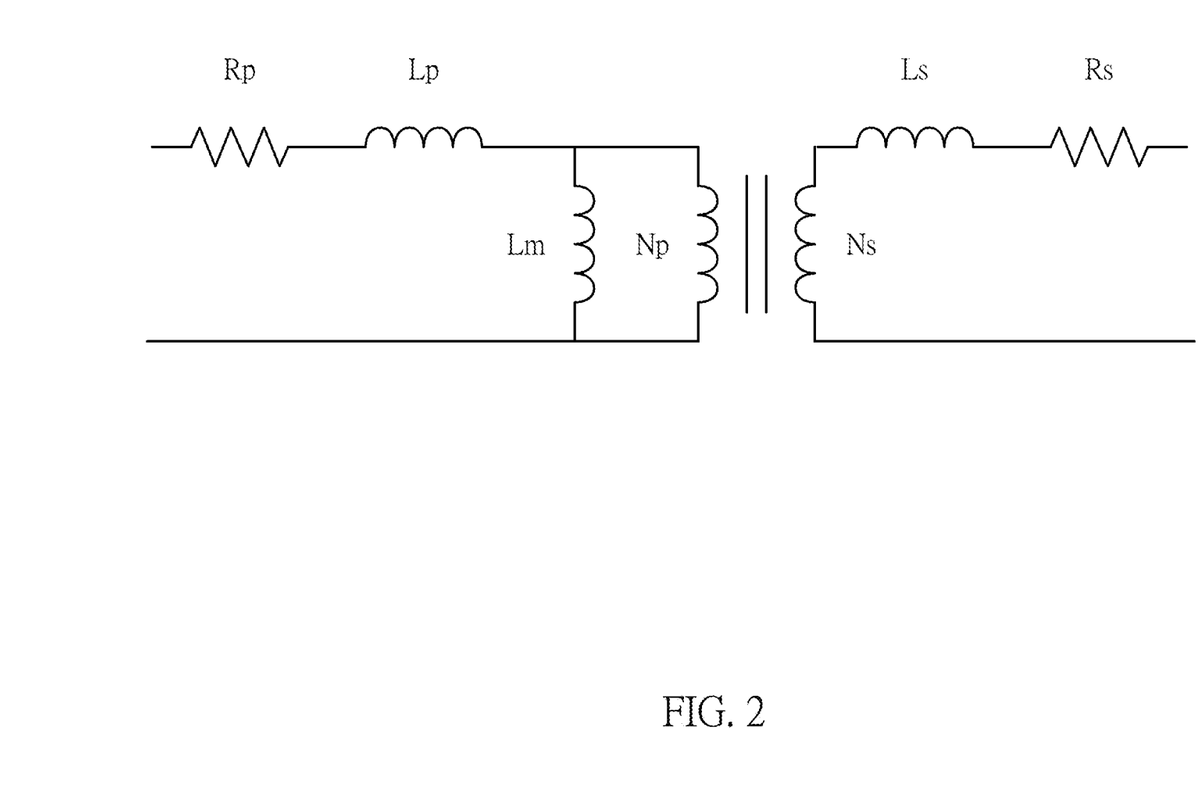
FIG. 2 is a diagram illustrating a transformer model of the transformer 160 according to some embodiments of the present disclosure.

Reference is made to FIG. 2. FIG. 2 is a diagram illustrating a transformer model of the transformer 160 according to some embodiments of the present disclosure. As shown in FIG. 2, in some embodiments, the equivalent circuit model of the transformer 100 includes a primary-winding resistance Rp, a primary-winding leakage inductance Lp, a secondary-winding resistance Rs, a secondary-winding leakage inductance Ls, a magnetizing inductance Lm, and an ideal primary winding Np and an ideal secondary winding Ns. Specifically, the primary-winding resistance Rp and the secondary-winding resistance Rs indicate the copper loss at the primary side and the secondary side of the transformer 160 respectively.

It is noted that, the equivalent circuit model depicted in FIG. 2 is merely for the example and not meant to limit the present disclosure. For example, in some other embodiments, the transformer equivalent circuit model may further include a core loss resistance at the magnetizing branch, or the magnetizing inductance Lm at the magnetizing branch may be neglected to simplify the equivalent circuit. Since the voltage levels at the primary side and at the secondary side are different, for the convenience of circuit analysis, the transformer equivalent circuit model may be further referred to the primary side or the secondary side.

Figure 3:
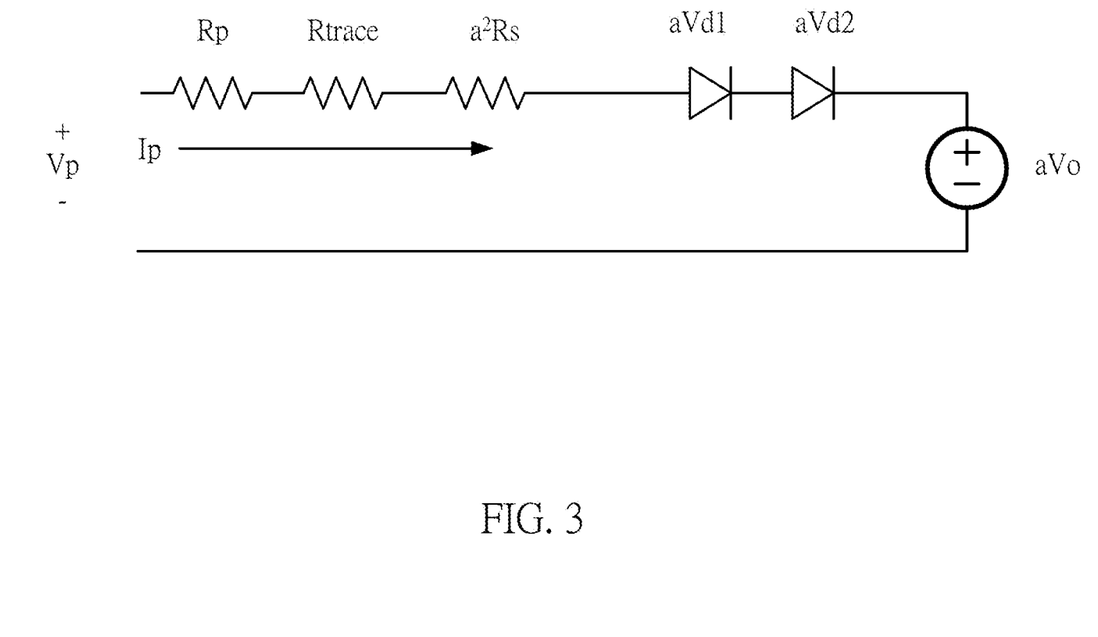
FIG. 3 is a diagram illustrating an equivalent transformer model of the primary-side voltage Vp and the output voltage Vo with the transformer 160 referred to the primary side according to some embodiments of the present disclosure.

Reference is made to FIG. 3. FIG. 3 is a diagram illustrating an equivalent transformer model of the primary-side voltage Vp and the output voltage Vo with the transformer 160 referred to the primary side according to some embodiments of the present disclosure. Rtrace denotes the trace resistance. Vd1, Vd2 denotes the diode voltage drops in the secondary-side rectifying circuit 180. The magnetizing inductance Lm and the core loss resistance at the magnetizing branch are neglected to simplify the equivalent circuit.

Specifically, the winding ratio a of the primary winding Np and the secondary winding Ns denotes the ratio of the voltage Vp across the primary winding and the voltage Vs across the secondary winding Ns, and also denotes the inverse ratio of the primary-side current Ip and the secondary-side current Is. Thus, the winding ratio a may be presented using the following equation.

$$a = \frac{Np}{Ns} = \frac{Vp}{Vs} = \frac{Is}{Ip}$$

Base on the above equation, on the condition that the equivalent circuit model of the transformer 160 is referred to the primary side, the equivalent resistance value and the equivalent inductance value of the primary-winding resistance Rp and the primary-winding leakage inductance Lp remain unchanged. On the other hand, the equivalent resistance value and the equivalent inductance value of the secondary-winding resistance Rs and the secondary-winding leakage inductance Ls referring to the primary side are the original value multiplied by the square of the winding ratio a. In addition, the voltage values of the secondary side of the transformer 160 are multiplied by the winding ratio a to refer to the primary side, such as the diode voltage drops Vd1, Vd2 in the secondary-side rectifying circuit 180 and the output voltage Vo.

Figure 4:
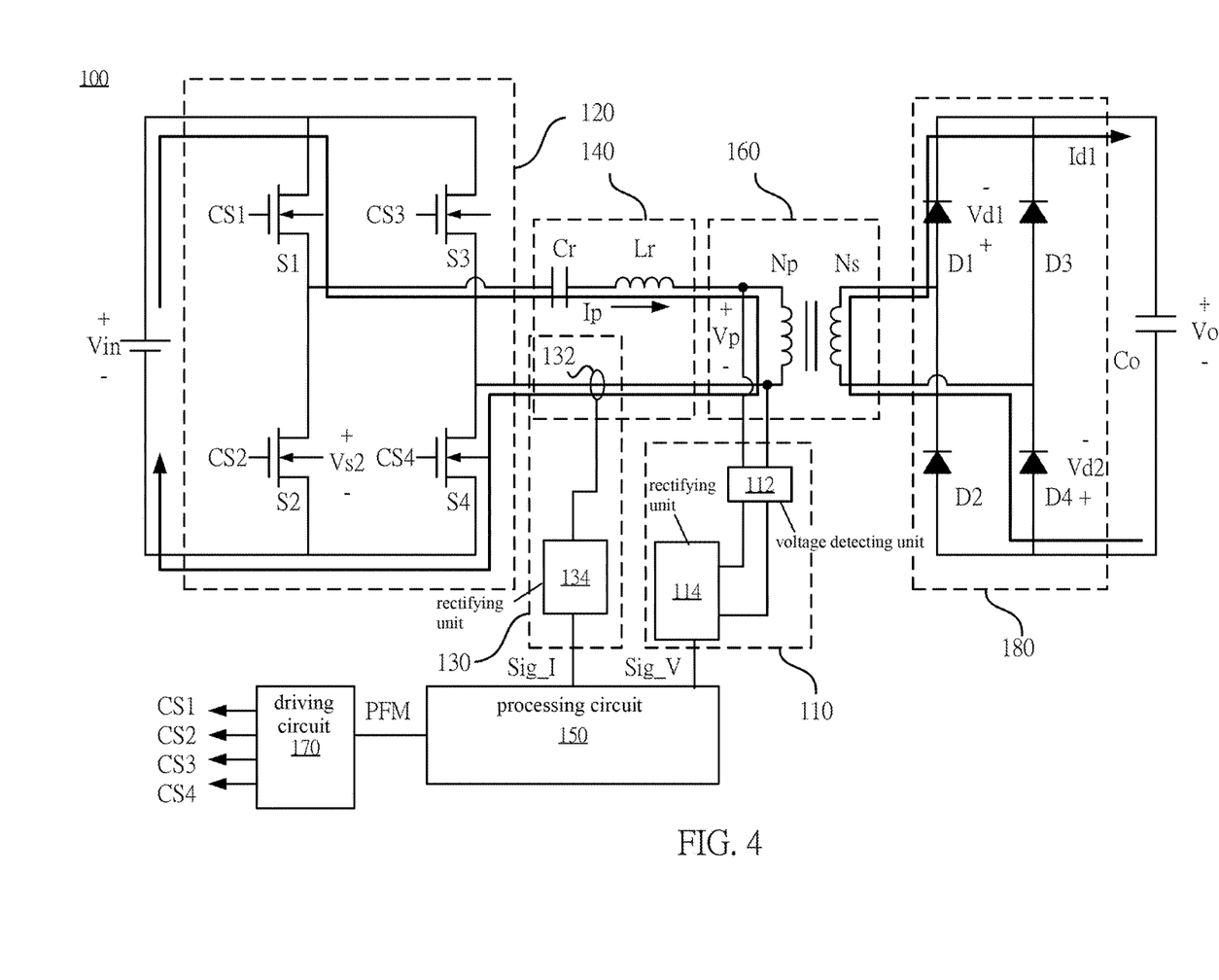
FIG. 4 and FIG. 5 are schematic operating diagrams illustrating the power converter 100 according to some embodiments of the present disclosure.
Figure 5:
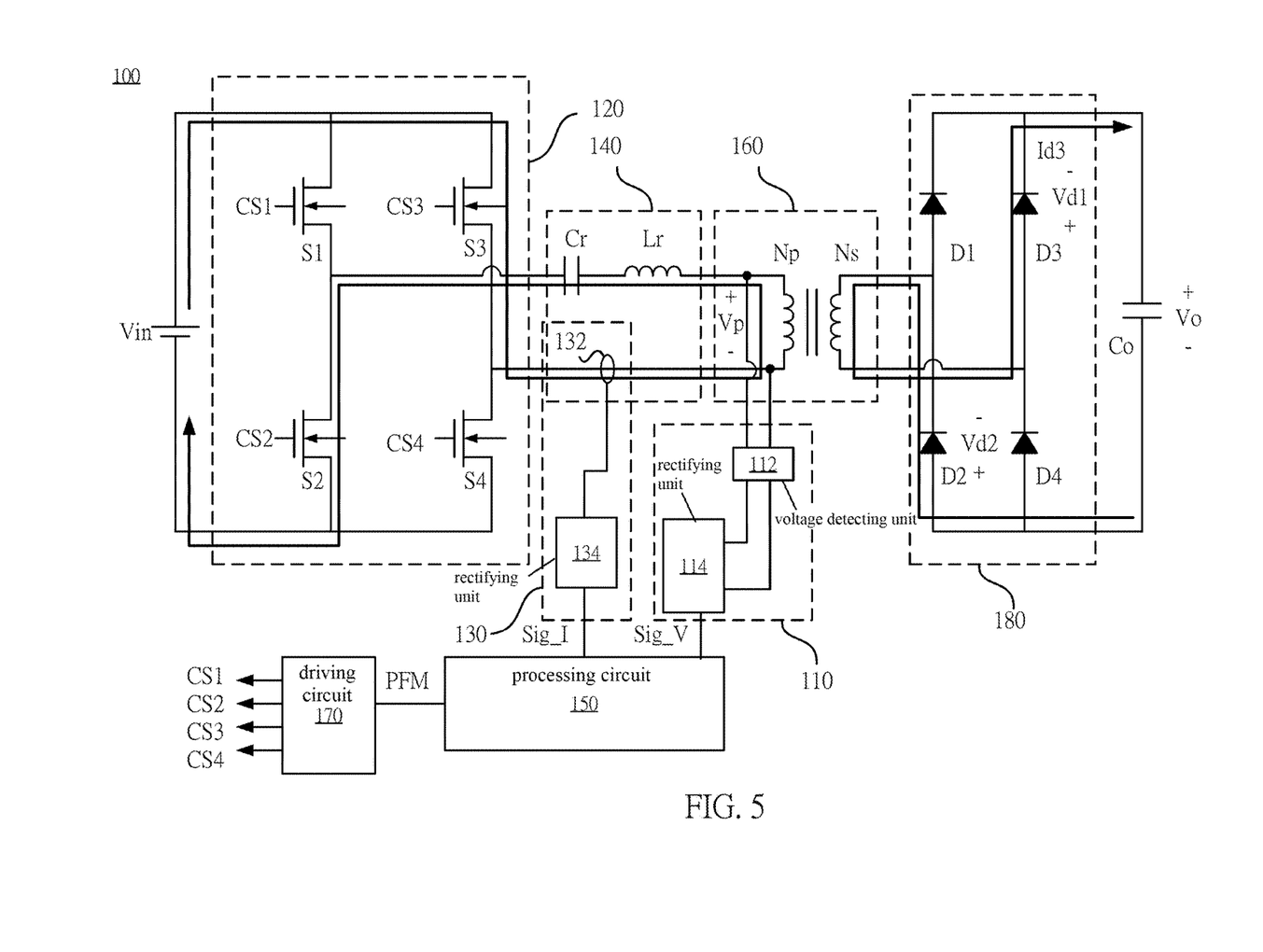

Reference is made to FIG. 4 and FIG. 5 to explain the operating process of the power converter 100 and the diode voltage drops Vd1, Vd2 in the secondary-side rectifying circuit 180. FIG. 4 and FIG. 5 are schematic operating diagrams illustrating the power converter 100 according to some embodiments of the present disclosure. As shown in FIG. 4, in the first half cycle, the switches S1, S4 are turned on. The primary-side current Ip flows into the primary winding Np, and the power is transmitted to the secondary winding Ns via the transformer 160, and the current Id1 is outputted via the conducting diodes D1 and D4.

As shown in FIG. 5, in the second half cycle, the switches S2, S3 are turned on. The direction of the primary-side current Ip is reversed from the first half cycle, and the primary-side current Ip flows into the primary winding Np, and the power is transmitted to the secondary winding Ns via the transformer 160, and the current Id3 is outputted via the conducting diodes D2 and D3.

Accordingly, no matter in the first half cycle or in the second half cycle, the voltage Vs across the secondary winding Ns goes through two diode voltage drops Vd1 (e.g., the drop of the diode D1 or the diode D3) and Vd2 (e.g., the drop of the diode D2 or the diode D4).

Thus, the relationship equation between the voltage Vp across the primary winding Np and the output voltage Vo may be obtained based on the equivalent circuit model depicted in FIG. 3. Specifically, based on FIG. 3, the relationship equation may be presented as the following equation.

$$Vp = IpRp + a^2 IpRs + IpRtrace + aVd1 + aVd2 + aVa$$

The equation above may be arranged and presented as the following equations.

$$aVo = Vp - Ip(Rp + a^2 Rs + Rtrace) - aVd1 - aVd2$$

$$Vo = \frac{1}{a}(Vp - IpReq) - Vd1 - Vd2$$

Thus, the voltage Vp across the primary winding Np and the output voltage Vo may be described as a relationship equation using the winding ratio a, the primary-side current Ip, the primary-winding resistance Rp, the secondary-winding resistance Rs, the trace resistance Rtrace and the diode voltage drops Vd1, Vd2 as the calculation parameters. The primary-winding resistance Rp, the secondary-winding resistance Rs, and the trace resistance Rtrace may further be integrated into an equivalent resistance Req (i.e., the sum of the resistances Rp, $a^2$Rs, and Rtrace).

The parameters of the winding ratio a, the diode voltage drops Vd1, Vd2 and the equivalent resistance Req are hardware parameters of the transformer 160 and the secondary-side rectifying circuit 180 themselves, so may be considered to be known constants. Accordingly, the processing circuit 150 may output the pulse signal (e.g., the pulse frequency modulation signal PFM) according to the voltage sensing signal Sig_V and the current sensing signal Sig_I to control the switching frequency of the driving signals CS1, CS2, CS3 and CS4.

For example, the processing circuit 150 may obtain the current value of the voltage Vp across the primary winding Np and the primary-side current Ip according to the voltage sensing signal Sig_V and the current sensing signal Sig_I, and calculate the amplitude of the output voltage Vo based on the above equations and models, and then compare the instance output voltage Vo with a target value. On the condition that the instance output voltage Vo is greater than the target value (e.g., under a light load), the processing circuit 150 may output corresponding pulse frequency modulation signal PFM to the driving circuit 170, to increase the switching frequency of the driving signals CS1, CS2, CS3 and CS4. On the other hand, on the condition that the instance output voltage Vo is lower than the target value (e.g., under a heavy load), the processing circuit 150 may output corresponding pulse frequency modulation signal PFM to the driving circuit 170, to lower the switching frequency of the driving signals CS1, CS2, CS3 and CS4 to stabilize the output voltage Vo.

Alternatively stated, the processing circuit 150 may obtain the relationship equation between the voltage Vp across the primary winding Np and the output voltage Vo based on the transformer model, the primary-side current Ip and diode voltage drops of the diodes D1-D4 in the secondary-side rectifying circuit 180, and adjust the switching frequency of the driving signals CS1, CS2, CS3, and CS4 accordingly.

Thus, on the condition that the DC output voltage Vo is in medium voltage range, the power converter 100 is not required to detect the DC output voltage Vo at the secondary side and feedback the signal to the primary side via isolation elements. On the other hand, the voltage sensing signal and the current sensing signal as the feedback signals may be implemented at the primary side of the transformer 160 directly. Since the signal feedback is at the same side as the processing circuit 150, the driving circuit 170 and the primary switching circuit 120, no signal conversion performed by the isolation elements is required and the circuit cost may be reduced. Furthermore, the signal error due to the conversion between the primary side and the secondary side is avoided, and thus the accuracy and the speed of the feedback control may be increased.

It is noted that, the equivalent circuit model shown in FIG. 3 is merely one possible embodiment of the present disclosure, and not meant to limit the present disclosure. For example, in some other embodiments, in the application of which a high error tolerance of the output voltage Vo is guaranteed, the equivalent circuit model may be further simplified according to actual needs and the system parameters such as diode voltage drops Vd1, Vd2 may be neglected. In another example, in some other embodiments, in the application of which a low error tolerance of the output voltage Vo is required, the equivalent circuit model may be more precise. For instance, system parameters such as diode voltage drops Vd1, Vd2 may be obtained by constructing models according to the current flowing though and the temperature. Alternatively stated, one skilled in the art may choose proper transformer model or various relationship equations for the calculation of the relation between the voltage Vp across the primary winding Np and the output voltage Vo.

Figure 6:
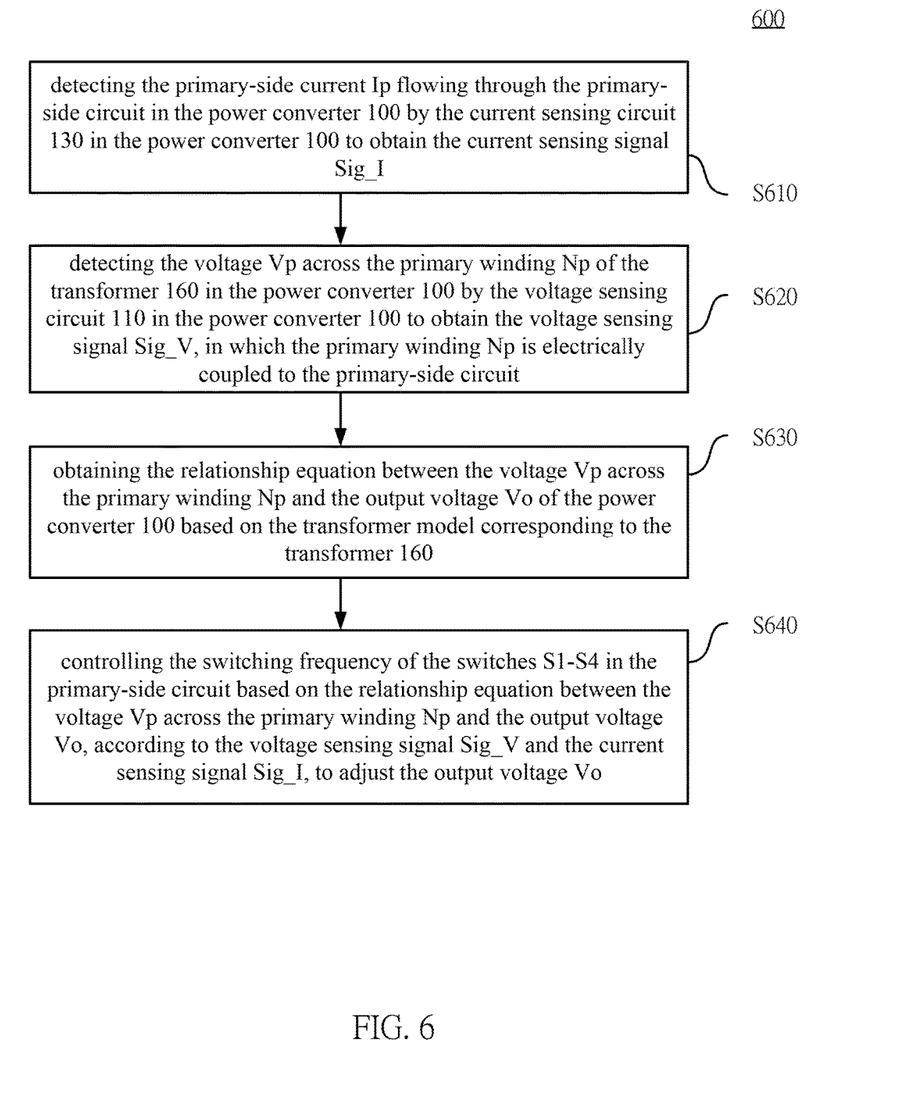
FIG. 6 is a flowchart diagram illustrating a control method 600 of the power converter 100 according to some embodiments of the present disclosure.

Reference is made to FIG. 6. FIG. 6 is a flowchart diagram illustrating a control method 600 of the power converter 100 according to some embodiments of the present disclosure. For better understanding, the control method 600 is discussed in accompanying with the embodiments shown in FIG. 1-FIG. 5, but is not limited thereto. It will be apparent to those skilled in the art that various modifications and variations can be made without departing from the scope or spirit of the disclosure. As shown in FIG. 6, the control method 600 includes steps S610, S620, S630 and S640.

First, in step S610, the primary-side current Ip flowing through the primary-side circuit in the power converter 100 is detected by the current sensing circuit 130 in the power converter 100 to obtain the current sensing signal Sig_I.

In step S620, the voltage Vp across the primary winding Np of the transformer 160 in the power converter 100 is detected by the voltage sensing circuit 110 in the power converter 100 to obtain the voltage sensing signal Sig_V, in which the primary winding Np is electrically coupled to the primary-side circuit.

In step S630, the relationship equation between the voltage Vp across the primary winding Np and the output voltage Vo of the power converter 100 is obtained based on the transformer model corresponding to the transformer 160.

Specifically, in some embodiments, the transformer model includes the winding ratio parameter, the primary-winding resistance parameter, and the secondary-winding resistance parameter, and step S630 includes obtaining the relationship equation between the voltage Vp across the primary winding Np and the output voltage Vo based on the transformer model, the primary-side current Ip, and voltage drops of the diodes D1-D4 in the secondary-side rectifying circuit 180 in the power converter 100.

In step S640, the switching frequency of the switches S1-S4 in the primary-side circuit is controlled based on the relationship equation between the voltage Vp across the primary winding Np and the output voltage Vo, according to the voltage sensing signal Sig_V and the current sensing signal Sig_I, to adjust the output voltage Vo.

Specifically, in some embodiments, controlling the switching frequency of the switches S1-S4 in step S640 includes calculating and outputting the pulse frequency modulation signal PFM according to the current sensing signal Sig_I and the voltage sensing signal Sig_V by the processing circuit 150 and receiving the pulse frequency modulation signal PFM and outputting driving signals CS1-CS4 according to the pulse frequency modulation signal PFM by the driving circuit 170, to respectively turn on or off the switches S1-S4 selectively to adjust the switching frequency of the switches S1-S4.

Those skilled in the art can immediately understand how to perform the operations and functions of the control method 600 based on the power converter 100 in the aforementioned embodiments, and thus a further explanation is not described again herein for the sake of brevity.

The above description includes exemplary operations, but the operations are not necessarily performed in the order described. The order of the operations disclosed in the present disclosure may be changed, or the operations may even be executed simultaneously or partially simultaneously as appropriate, in accordance with the spirit and scope of various embodiments of the present disclosure.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A power converter, comprising:
a primary-side switching circuit comprising a plurality of switches, wherein the primary-side switching circuit is configured to switch the switches to be on or off based on a pulse signal to convert a dc input voltage to a square wave signal;
a resonant circuit electrically coupled to the primary-side switching circuit and configured to receive the square wave signal to provide a primary-side current;
a transformer, wherein a primary winding of the transformer is electrically coupled to the resonant circuit;
a secondary-side rectifying circuit electrically coupled to a secondary winding of the transformer and configured to rectify a secondary ac signal outputted by the secondary winding and to output an output voltage;

a voltage sensing circuit configured to detect voltage across the primary winding and output a voltage sensing signal accordingly;

a current sensing circuit configured to detect the primary-side current and output a current sensing signal accordingly; and a processing circuit configured to output the pulse signal according to the voltage sensing signal and the current sensing signal, wherein the processing circuit is further configured to obtain a relationship equation between the voltage across the primary winding and the output voltage based on a transformer model corresponding to the transformer, the primary-side current and a diode voltage drop in the secondary-side rectifying circuit, in order to adjust the pulse signal accordingly.

2. The power converter of claim 1, wherein the processing circuit is configured to adjust a switching frequency of the switches by the pulse signal to control the output voltage.

3. The power converter of claim 1 wherein the transformer model comprises a winding ratio parameter, a primary-winding resistance parameter, and a secondary-winding resistance parameter.

4. The power converter of claim 1, further comprising a driving circuit, wherein the driving circuit is electrically coupled to the processing circuit and the switches in the primary-side switching circuit, and the driving circuit is configured to output a plurality of driving signals to the switches respectively according to the pulse signal to switch the switches to be on or off.

5. The power converter of claim 1, wherein the resonant circuit comprises a resonant capacitance unit and a resonant inductance unit electrically coupled to each other in series.

6. The power converter of claim 1, wherein the switches comprise:
a first switch, wherein a first terminal of the first switch is electrically coupled to a positive terminal of an input voltage source, and a second terminal of the first switch is electrically coupled to a first terminal of the resonant circuit;
a second switch, wherein a first terminal of the second switch is electrically coupled to the first terminal of the resonant circuit, and a second terminal of the second switch is electrically coupled to a negative terminal of the input voltage source;
a third switch, wherein a first terminal of the third switch is electrically coupled to the positive terminal of the input voltage source, and a second terminal of the third switch is electrically coupled to a second terminal of the resonant circuit; and
a fourth switch, wherein a first terminal of the fourth switch is electrically coupled to the second terminal of the resonant circuit, and a second terminal of the fourth switch is electrically coupled to the negative terminal of the input voltage source.

7. The power converter of claim 1, wherein the secondary-side rectifying circuit comprises:
a first diode, wherein an anode of the first diode is electrically coupled to a first terminal of the secondary winding, and a cathode of the first diode is electrically coupled to a first terminal of an output capacitor;
a second diode, wherein an anode of the second diode is electrically coupled to a second terminal of the output capacitor, and a cathode of the second diode is electrically coupled to the anode of the first diode;
a third diode, wherein an anode of the third diode is electrically coupled to a second terminal of the secondary winding, and a cathode of the third diode is electrically coupled to the first terminal of the output capacitor; and
a fourth diode, wherein an anode of the fourth diode is electrically coupled to the second terminal of the output capacitor, and a cathode of the fourth diode is electrically coupled to the anode of the third diode.

8. A power converter, comprising:
a primary-side circuit comprising a plurality of switches, wherein the switches are configured to be on or off according to a plurality of driving signals;
a transformer, comprising:
a primary winding electrically coupled to the primary-side circuit and configured to receive a primary-side square wave signal; and
a secondary winding configured to output a secondary ac signal in response to the primary-side square wave signal;
a voltage sensing circuit configured to detect voltage across the primary winding and output a voltage sensing signal accordingly;
a current sensing circuit configured to detect a primary-side current of the primary winding and output a current sensing signal according to the primary-side current;
a secondary-side rectifying circuit electrically coupled to the secondary winding and configured to rectify the secondary ac signal and output an output voltage; and
a processing circuit configured to adjust a switching frequency of the plurality of driving signals according to the voltage sensing signal and the current sensing signal;
wherein the processing circuit is further configured to obtain a relationship equation between the voltage across the primary winding and the output voltage based on a transformer model corresponding to the transformer, the primary-side current and a diode voltage drop in the secondary-side rectifying circuit, in order to adjust the switching frequency accordingly.

9. The power converter of claim 8, wherein the transformer model comprises a winding ratio parameter, a primary-winding resistance parameter, and a secondary-winding resistance parameter.

10. The power converter of claim 8, further comprising a driving circuit, wherein the driving circuit is electrically coupled to the processing circuit and the switches in the primary-side circuit, the processing circuit is configured to output a pulse frequency modulation signal according to the voltage sensing signal and the current sensing signal, and the driving circuit is configured to output the plurality of driving signals to the switches respectively according to the pulse frequency modulation signal to switch the switches to be on or off.

11. The power converter of claim 8, wherein the primary-side circuit further comprises a resonant circuit, wherein the resonant circuit comprises a resonant capacitance unit and a resonant inductance unit electrically coupled to each other in series.

12. The power converter of claim 11, wherein the switches in the primary-side circuit comprise:
a first switch, wherein a first terminal of the first switch is electrically coupled to a positive terminal of an input voltage source, and a second terminal of the first switch is electrically coupled to a first terminal of the resonant circuit;
a second switch, wherein a first terminal of the second switch is electrically coupled to the first terminal of the resonant circuit, and a second terminal of the second switch is electrically coupled to a negative terminal of the input voltage source;

a third switch, wherein a first terminal of the third switch is electrically coupled to the positive terminal of the input voltage source, and a second terminal of the third switch is electrically coupled to a second terminal of the resonant circuit; and a fourth switch, wherein a first terminal of the fourth switch is electrically coupled to the second terminal of the resonant circuit, and a second terminal of the fourth switch is electrically coupled to the negative terminal of the input voltage source.

13. The power converter of claim 8, wherein the secondary-side rectifying circuit comprises:

a first diode, wherein an anode of the first diode is electrically coupled to a first terminal of the secondary winding, and a cathode of the first diode is electrically coupled to a first terminal of an output capacitor;

a second diode, wherein an anode of the second diode is electrically coupled to a second terminal of the output capacitor, and a cathode of the second diode is electrically coupled to the anode of the first diode;

a third diode, wherein an anode of the third diode is electrically coupled to a second terminal of the secondary winding, and a cathode of the third diode is electrically coupled to the first terminal of the output capacitor; and a fourth diode, wherein an anode of the fourth diode is electrically coupled to the second terminal of the output capacitor, and a cathode of the fourth diode is electrically coupled to the anode of the third diode.

14. A control method of a power converter, comprising:

detecting, by a current sensing circuit in the power converter, a primary-side current flowing through a primary-side circuit in the power converter to obtain a current sensing signal;

detecting, by a voltage sensing circuit in the power converter, a voltage across a primary winding of a transformer in the power converter to obtain a voltage sensing signal, wherein the primary winding is electrically coupled to the primary-side circuit;

obtaining a relationship equation between the voltage across the primary winding and an output voltage of the power converter based on a transformer model corresponding to the transformer, the primary-side current, and a diode voltage drop in a secondary-side rectifying circuit in the power converter; and controlling, based on the relationship equation between the voltage across the primary winding and the output voltage, a switching frequency of a plurality of switches in the primary-side circuit according to the voltage sensing signal and the current sensing signal to adjust the output voltage.

15. The power converter control method of claim 14, wherein the transformer model comprises a winding ratio parameter, a primary-winding resistance parameter, and a secondary-winding resistance parameter.

16. The power converter control method of claim 14, wherein controlling the switching frequency of the plurality of switches comprises:

calculating and outputting, by a processing circuit, a pulse frequency modulation signal according to the current sensing signal and the voltage sensing signal; and receiving, by a driving circuit, the pulse frequency modulation signal and outputting a plurality of driving signals according to the pulse frequency modulation signal to respectively turn on or off the plurality of switches selectively to adjust the switching frequency of the plurality of switches.

* * * * *